United States Patent [19]

Kundert

[11] Patent Number: 4,659,290

[45] Date of Patent: Apr. 21, 1987

[54] FAN SPEED CONTROLLER

[75] Inventor: Warren R. Kundert, Harvard, Mass.

[73] Assignee: Control Resources, Inc., Harvard, Mass.

[21] Appl. No.: 715,663

[22] Filed: Mar. 25, 1985

[51] Int. Cl.[4] .............................................. F04B 49/10
[52] U.S. Cl. ...................................... 417/32; 318/334; 318/473; 236/DIG. 9
[58] Field of Search .................... 417/32, 14; 318/334, 318/473; 361/379, 384; 310/68 C; 416/93 R; 236/DIG. 9

[56] References Cited

U.S. PATENT DOCUMENTS

| | | | |
|---|---|---|---|
| 2,447,723 | 8/1948 | Wheeler | 417/32 |
| 3,353,078 | 11/1967 | Maynard | 318/334 |
| 3,449,605 | 6/1969 | Wilson | 416/93 R |
| 3,543,119 | 11/1970 | Bauer et al. | 318/334 |
| 3,896,359 | 7/1975 | Olander et al. | 318/473 |
| 4,352,635 | 10/1982 | Saunders | 417/32 |
| 4,506,199 | 3/1985 | Asche | 318/473 |

FOREIGN PATENT DOCUMENTS 2398197 3/1979 France .................... 417/32

*Primary Examiner*—Carlton R. Croyle
*Assistant Examiner*—Donald E. Stout
*Attorney, Agent, or Firm*—Henry D. Pahl, Jr.

[57] ABSTRACT

The fan speed controller disclosed herein mounts directly on a fan whose speed is to be controlled and provides electronic speed control circuitry mounted in a disk-like enclosure aligned with the fan hub. The enclosure is compartmented and apertured to provide a representative air flow past a temperature sensitive element employed by the circuitry. Fan speed is controlled as a function of air temperature above a sharply defined minimum to provide effective cooling with minimal noise generation.

1 Claim, 4 Drawing Figures

FAN SPEED CONTROLLER

BACKGROUND OF THE INVENTION

The present invention pertains to fans for cooling electronic equipment and more particularly to such a fan in which speed is controlled to maintain relatively constant equipment temperature and substantially reduce unnecessary acoustical noise.

While variable speed or thermostatically controlled fans have been proposed heretofore, prior controller designs have not been well suited for integration with the axial flow fans which are specifically designed for cooling electronic equipment. Further, these prior art systems have not, in general, been responsive to the actual needs of an overall or complete system, particularly when such a system is to be installed in an office environment.

One problem which is engendered by the use of cooling fans for electronic equipment used in an office environment is the noise which such fans can generate. This problem is compounded by the tendency of electronic equipment designers to provide cooling for so-called worst case conditions. In other words, the designer will typically include sufficient air flow capacity to deal with the densest system configuration, most heavily loaded on the hottest expected day. The air flow theoretically required for such worst case conditions will typically be much more than that required under typical or nominal conditions and the fans specified to provide such capability will generate excessive and unnecessary noise. It is, however, very important to assure sufficient cooling capacity since electronic systems, particularly those employing solid state components, are subject to various failures upon overheating.

Among the several objects of the present invention may be noted the provision of a fan system which will sufficiently cool electronic equipment to ensure high reliability; the provision of such a system which is readily integrated with the type of fans typically employed for cooling electronic components; the provision of such a system which is highly reliable and which is of relatively simple and inexpensive construction. Other objects and features will be in part apparent and in part pointed out hereinafter.

SUMMARY OF THE INVENTION

Briefly, the integrated fan speed controller of the present invention provides speed control circuitry mounted within a disk like enclosure which is adapted to be mounted in alignment with the hub of an axial flow fan. The circuit board on which the circuitry is mounted divides the enclosure into inner and outer chambers. The enclosure is apertured on its outer face and around its inner periphery to permit air flow into the outer chamber and out of the inner chamber, respectively. The speed control circuitry includes a temperature sensing element which is positioned in an opening in the circuit board so that the air flow between the inner and outer chambers maintains the temperature of the sensing element which fairly represents the temperature of the air being drawn through the fan. Preferably, the speed control circuitry includes components for energizing the fan motor as a function of a logical ORing of a fixed control signal and a second control signal which varies as a function of the sensing element temperature whereby fan speed is controlled as a function of air temperature only above a sharply defined minimum speed. This minimum is set to provide adequate cooling of the electronic equipment under typical or nominal conditions.

BRIEF DESCRIPTION OF THE DRAWINGS

Corresponding reference characters indicate corresponding parts throughout the several views of the drawings.

DESCRIPTION OF THE PREFERRED EMBODIMENT

Figure 1:
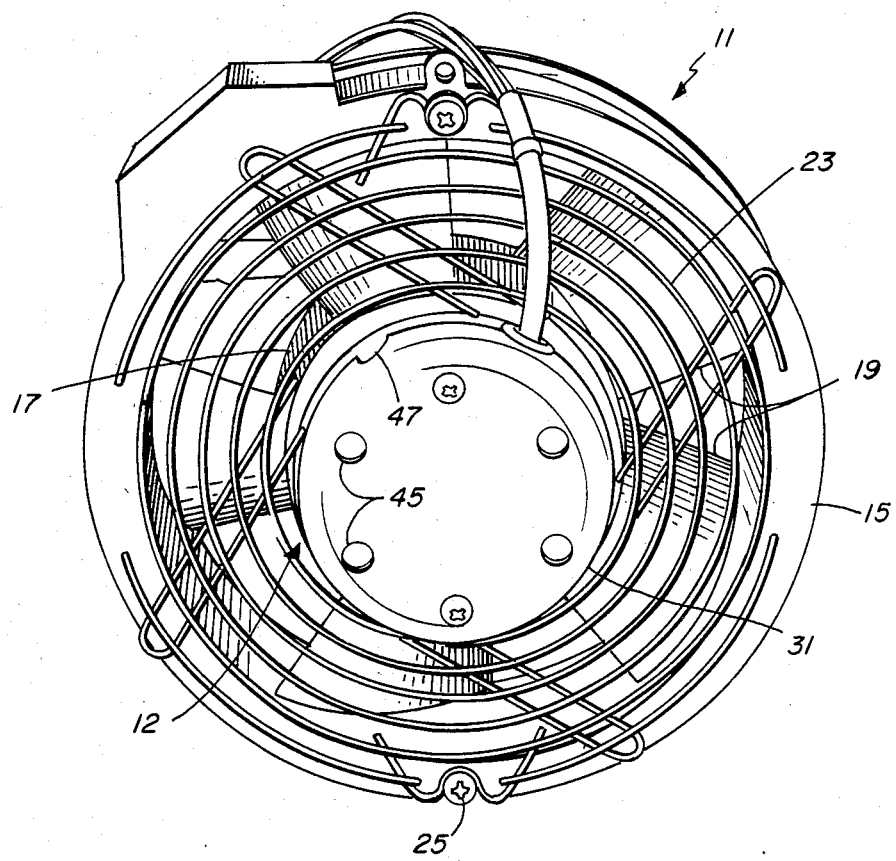
FIG. 1 is a face view of an integrated fan speed controller in accordance with the present invention mounted on an axial flow fan of the type commonly employed for cooling electronic systems.

Referring now to FIG. 1 there is shown an integrated fan speed controller constructed in accordance with the present invention and mounted on the inlet side face of an axial flow fan of the type commonly employed to cool electronic systems, e.g. by exhausting heated air from the electronic system enclosure. The fan is designated by reference character 11 while the controller is designated generally by reference character 12. As is understood, axial fans of the type illustrated typically comprise an annular outer housing 15 and inner hub 17 supported on one or more struts 18 (not shown). The hub 17 contains the fan motor which drives a plurality of blades 19 which propel air through the fan housing.

As is described in greater detail hereinafter, the fan speed controller of the present invention employs an electronic fan motor speed controller circuit which responds to the temperature of a sensing element to control fan speed as a function of air temperature. With reference to FIG. 1 the control circuitry together with the sensing element is mounted in a disk-like enclosure 21. Enclosure 21 is of a diameter which roughly corresponds with that of the hub 17 and is mounted in alignment with the hub by means of a wire grill or screen 23 which is attached to the annular housing 15 by means of screws 25.

Figure 2:
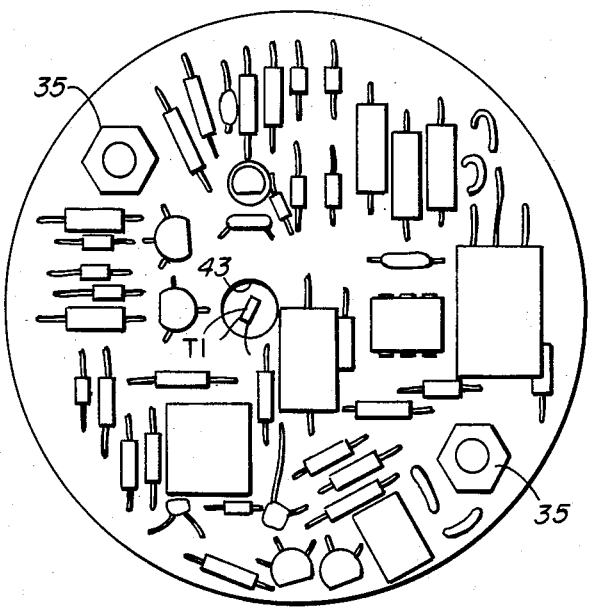
FIG. 2 is a plan view of the controller removed from the fan and with the controller enclosure cover removed from over the controller electronics.
Figure 3:
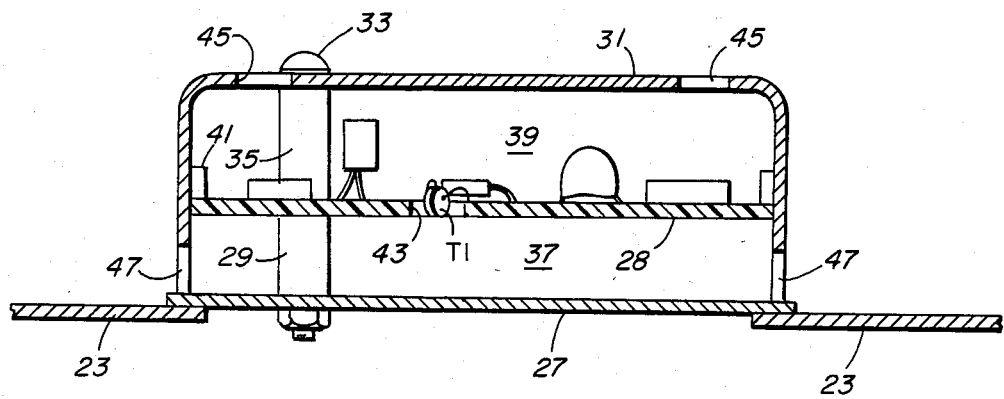
FIG. 3 is a side view in section (with parts broken away) of the controller of FIG. 1, taken substantially on the line 3—3 of FIG. 1.

With reference to FIG. 3, it may be seen that the enclosure 21 comprises a circular metal base plate 27 which is welded to the wire grill 23. A circular circuit board 28 is mounted on baseplate 27 by means of standoffs 29 and the cup-like enclosure cover 31 is, in turn, held by screws 33 threading into extension standoffs 35. As may be seen from FIG. 3, the circuit board 28 effectively divides the enclosure into an inner chamber 37 and an outer chamber 39 with respect to the fan hub. A strip of foam gasket material 41 applied around the cover 31 further seals the circuit board to the enclosure. As may be seen in FIG. 2, the circuit board 28 has an aperture or opening through it, as indicated at 43. This opening provides for a venting or air flow between the outer and inner chambers of the enclosure.

The fan motor speed control circuitry, described in greater detail hereinafter, is mounted in its entirety on the circuit board 28. As indicated previously, this circuitry includes a temperature sensing element, a thermistor T1 in the embodiment illustrated, and this temperature sensing element is mounted by its leads so as to be positioned centrally in the opening 43. Referring again to FIG. 1 and 3, it may be seen that the face of the cup like cover 31 includes several openings or apertures 45 for admitting air into the outer chamber 39. The periphery of the cup like cover 31 also includes several notches or apertures 47 which open, adjacent base plate 27, into the inner chamber 37.

The scheme of apertures employed in the face and periphery of the enclosure cover is effective in producing a reliable and representative air flow through the opening 43 in which the temperature sensing element T1 is mounted, flow being induced by the difference in air pressure between apertures 45 and 47.

Figure 4:
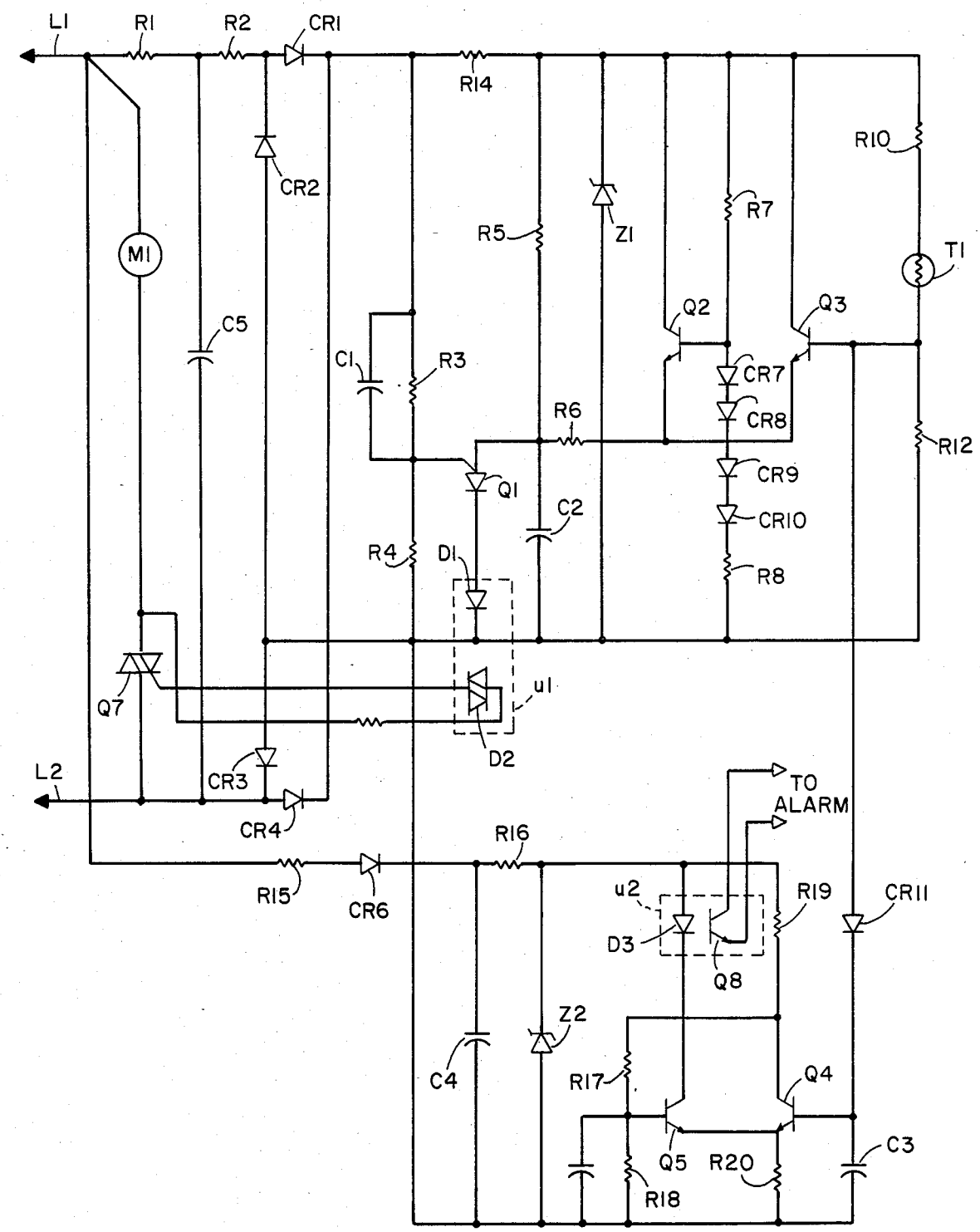
FIG. 4 is a schematic circuit diagram of fan motor speed control circuitry employed in the integrated controller of FIGS. 1—3.

The circuit embodiment of FIG. 4 is intended for fans with a.c. motors. Other embodiments perform substantially similar functions when used with d.c. motors. Referring now to FIG. 4, a.c. supply leads are indicated by reference characters L1 and L2. The motor of the fan, designated by reference character M1 in FIG. 4, is connected across the supply leads through a triac Q7 which allows the power applied to the fan motor to be varied by phase angle modulation of the triac. Triggering of the triac Q7 is implemented by control circuitry to the right hand side of the diagram. Regulation of the supply voltage to this control circuitry is provided by a zener diode Z1. Full wave rectified current is provided to the control circuitry by a full wave bridge comprising rectifier CR1–CR4, a substantial voltage drop being provided by a pair of resistors R1 and R2. A capacitor C5 connected between these resistors shunts noise or transients which may be present on the supply lines.

Phase angle modulation is provided by means of a uni-junction transistor Q1 which functions in a so called ramp and pedestal mode of operation. When uni-junction transistor Q1 fires, it triggers the triac Q7 through an opto-isolator U1 comprising a light emitting diode D1 and a light sensitive diac or triggering diode D2. A reference voltage is applied to the gate electrode of uni-junction transistor Q1 by a voltage divider comprising resistors R3 and R4. Capacitor C1 accelerates the application of a sufficient voltage to this electrode at the start of each half cycle of the full-wave rectified supply voltage to prevent premature firing.

A variable or controlled voltage is applied to the anode of uni-junction transistor Q1 to provide the phase angle power modulation referenced previously. As is understood, the uni-junction transistor Q1 will fire when this variable voltage becomes slightly higher (more positive) than the voltage at the gate. In the ramp and pedestal mode of phase angle modulation, the ramp rate remains essentially constant and the phase shift is provided by shifting the starting point, i.e., the pedestal from which the ramp starts. In other words, the pedestal level provides the control. In the circuit of FIG. 4, the "ramp" component of the ramp and pedestal control scheme is obtained by the charging of a capacitor C2 through a resistor R5.

The control signal which sets the pedestal level is obtained by the logical ORing of an essentially fixed control voltage and a variable control voltage which varies as a function of air temperature. The logical ORing function is provided by two transistors Q2 and Q3 either of which can charge the capacitor C2 to its initial pedestal voltage through a current limiting resistor R6. A substantially constant voltage is supplied to the base of transistor Q2 through a divider comprising resistors R7 and R8. Several diodes CR7 - CR10 are included in the divider to provide a non-linear voltage drop which compensates for similiarly non-linear junction drops in the path of the trigger voltage signal. A variable control voltage is applied to the base of transistor Q3 by means of a voltage divider comprising thermistor T1 in series with a reference resistor R12. A trimming resistor R10 is provided in series with the thermistor T1.

Assuming the temperature of the air being drawn through the fan is relatively cool i.e., below a preselected threshold such as 30 degrees centigrade, the variable control voltage will be below the fixed control voltage. Thus, the transistor Q3 will be cut off and the pedestal level will be maintained at a substantially constant level and fan speed will correspondingly be held to a substantially constant level. On the other hand, if the air temperture rises above the preselected threshold, causing the resistance of thermistor T1 to decrease, the variable control voltage will exceed the fixed control voltage and a higher pedestal will be established by conduction through the transistor Q3. As will be understood, this higher pedestal will cause the ramp voltage to reach the trigger level in a shorter time, causing an earlier firing of the triac resulting in more power being applied to the fan motor. Accordingly, more cooling is applied to the electronic components being serviced by the fan system. In essence it may be seen that a closed loop control is obtained which tends to maintain the exhaust air temperature substantially at a preselected level.

As indicated previously, it is highly desirable to maintain a predetermined fan speed, e.g. approximately half maximum speed, when air temperature is below the preselected threshold. The a.c. motors often employed with this type of axial fan, however, are quite sensitive to supply voltage variation at reduced voltages. While the fixed control voltage which operates at low air temperatures will maintain a constant firing angle for the triac Q7, line voltage variations might still cause the fan speed to wander somewhat due to causes outside of the control circuitry. It is for this reason that a further dropping resistor R14 is included in the supply lead between the voltage divider which provides the reference voltage to the uni-junction transistor and the charging circuit for the ramp capacitor. The voltage drop occasioned by this resistor R14 causes the firing threshold to be raised in the presence of an increased line voltage so that firing will occur later in the cycle. This delay in firing causes a reduction in the triac duty cycle and a reduction in power to the fan motor, i.e, changes which tend to offset or compensate for the increased line voltage. Thus the desired substantially constant fixed speed can be maintained even in the presence of line voltage variation.

In view of the dangers to electronic circuitry from overheating as discussed previously, the circuitry of FIG. 4 also includes an alarm system which coordinates with the temperature control circuitry. To provide d.c. for the alarm system, a filter capacitor C4 is charged from the line by means of a half-wave rectifier CR6 through a dropping resistor R15. The d.c. voltage is regulated by means of a zener diode Z2 supplied through a further dropping resistor R16. A pair of transistors, Q4 and Q5, are interconnected in a switching circuit providing some hysteresis. Under normal conditions, transitor Q4 is cut off and a nominal bias or reference potential is applied to the base of transistor Q5 by a voltage divider comprising resistors R17 and R18, the divider being energized from the load resistor R19 in the collector circuit of transistor Q4. The collector circuit of transistor Q5 drives the light-emitting diode D3 of an opto-isolator U2, a light-sensitive output transistor Q8 being provided for signaling an external alarm circuit. The variable control voltage derived from the thermistor T1 is applied, through a peak detecting and holding circuit comprising diode CR11 and capacitor C3, to the base of transistor Q4.

In normal operation the variable control voltage derived from the thermistor T1 is below the switching threshold established by transistor Q5 and thus the light-emitting diode D is energized, conduction through the light-sensitive transistor Q8 being an indication of normal rather than an abnormal condition. If, however, the system overheats notwithstanding the operation of the fan, e.g. due to overdissipation in the electronic equipment being cooled, clogging of a filter or the like, the variable control voltage will rise to a point where transistor Q4 is turned on. At this point, the switching circuit will, for a period during each half cycle of the power line voltage, de-energize the light-emitting diode D3 causing the transistor Q8 to cease conduction, signaling the abnormal condition. It is an advantage of this particular circuit arrangement that it is basically fail safe and will signal an alarm condition even in the case where the supply voltage of the control circuitry is interrupted.

In view of the foregoing, it may be seen that the several objects of the present invention are achieved and other advantageous results have been attained.

As various changes could be made in the above constructions without departing from the scope of the invention, it should be understood that all matter contained in the above description or shown in the accompanying drawings shall be interpreted as illustrative and not in a limiting sense.

What is claimed is:

1. A fan speed controller suitable for controlling a motor-driven fan for cooling heat dissipating electronic equipment, said controller comprising:

electronic power control means responsive to an input signal level for varying the energization of the fan motor;

means for generating a fixed level control signal corresponding to half maximum fan speed;

means, including an air temperature sensing element responsive to the temperature of exhaust air leaving the equipment, for generating a variable level control signal corresponding to the temperature of the exhaust air propelled by said fan; OR circuit means operative to generate an output signal substantially equal to the greatest of any input signal applied thereto, said fixed and variable control signals being applied to said OR circuit as inputs with said OR circuit means output signal being applied to said power control means as the input signal level, whereby, above half maximum, fan speed is controlled in a closed loop as a function of air temperature in a sensed tending to hold exhaust air temperature constant.

* * * * *